United States Patent [19]

Cavaliere et al.

[11] Patent Number: 4,698,800

[45] Date of Patent: Oct. 6, 1987

[54] BI-DIRECTIONAL TRANSCEIVER CIRCUIT

[75] Inventors: Joseph R. Cavaliere, Hopewell Junction; Albert Y. Chang, Poughkeepsie; Rocco J. Robortaccio, Hopewell Junction, all of N.Y.

[73] Assignee: International Business Machines Corporation, Armonk, N.Y.

[21] Appl. No.: 792,267

[22] Filed: Oct. 28, 1985

[51] Int. Cl.[4] ............................................. H04B 9/00
[52] U.S. Cl. ........................................ 370/24; 375/7
[58] Field of Search ..................... 370/24; 375/8, 7

[56] References Cited

U.S. PATENT DOCUMENTS

| | | | |
|---|---|---|---|
| 3,495,217 | 2/1970 | Brooks | 340/147 |
| 3,612,781 | 10/1971 | DaCosta et al. | 179/170 NC |
| 3,718,762 | 2/1973 | Nezu et al. | 178/68 |
| 3,760,200 | 9/1973 | Taniguchi et al. | 307/303 |
| 3,769,525 | 10/1973 | Foss et al. | 307/254 |
| 3,843,834 | 10/1974 | Burke | 178/58 A |
| 4,196,363 | 4/1980 | Malaviya | 307/362 |
| 4,315,167 | 2/1982 | Pelc | 307/241 |
| 4,346,312 | 8/1982 | Christopherson | 307/270 |
| 4,419,752 | 12/1983 | Sonnenberger et al. | 370/29 |

OTHER PUBLICATIONS

IBM Technical Disclosure Bulletin, A. Y. Chang, Simultaneous Bidirectional Transceiver Circuit, vol. 23, No. 4, Sep. 1980, pp. 1435-1437.

Primary Examiner—Robert L. Griffin
Assistant Examiner—Leslie Van Beek
Attorney, Agent, or Firm—Robert J. Haase

[57] ABSTRACT

A simultaneous bi-directional transceiver is described. The transceiver comprises two circuits which are disposed at opposite ends of an interchip cable. In response to the application of digital data signals to these circuits, they generate a trilevel voltage at the ends of the interchip cable. Then, in each circuit, a first input to a differential amplifier is generated from the trilevel voltage by a level shifter comprising a first diode and a first constant current sink and a second input to the differential amplifier is derived from the digital data input signal applied to that circuit by a level shifter comprising a second diode and a second constant current source. Finally, the transceiver outputs are generated from the differential amplifier outputs.

6 Claims, 3 Drawing Figures

BI-DIRECTIONAL TRANSCEIVER CIRCUIT

BACKGROUND OF THE INVENTION

The present invention pertains to bi-directional driver/receiver (transceiver) circuits.

In any system employing integrated circuits (chips), information must be transferred from one chip to another. This is true whether the chips reside on a single module or on different modules. Such information transfer over uni-directional paths is inefficient because it utilizes too many pins on each chip. In particular, two-way information exchange between two chips using uni-directional transfer paths requires two separate pins on each chip: one pin on each chip for the outgoing information and a separate pin on each chip for the incoming information.

One method used in the art for reducing the number of pins utilized on each chip for chip-to-chip communications involves using a single path for transferring information in both directions, i.e. bi-directional information transfer. However, in this method, information is transferred in only one direction at any one time. Although this method reduces the required number of pins per chip to one, the transfer circuits must include specialized circuitry which monitors the chip-to-chip communication and, when necessary, switches the direction of information flow between the chips.

As a result of the above, a system's performance would be improved by using a driver/receiver (transceiver) circuit that simultaneously transmits and receives information while using a single pin on each chip. Such a bi-directional transceiver would advantageously reduce the number of pin connections required for bi-directional information interchange between chips, thereby reducing the number of chip overflows on a module, and would reduce the time required to transfer information in both directions.

An article entitled "Simultaneous Bidirectional Transceiver Circuit" by A. Y. Chang and P. J. Pandya, in *IBM Technical Disclosure Bulletin*, Vol. 23, No. 4 September 1980, pp. 1435-1437 discloses a bi-directional transceiver which is capable of simultaneously transmitting and receiving digital information over a single cable without using time division or frequency multiplexing. Further, the transceiver can be used to transmit and receive information between chips on the same or different modules on the same board or on different boards.

Specifically, the disclosed transceiver consists of two circuits disposed on opposite ends of an interchip cable. The data to be transmitted across the interchip cable are simultaneously applied to the circuit on the appropriate side of the interchip cable. The data applied to the first circuit is received at the output of the second circuit at the same time that the data applied to second circuit is received at the output of the first circuit.

Each of the circuits disposed at the ends of the interchip cable contains a current switching circuit whose output depends on two input voltages. For each circuit, the first input voltage is derived, by means of a first d.c. bias network with a split resistor, from a trilevel voltage generated at the end of the interchip cable and the second input voltage is derived, by means of a second d.c. bias network with a split resistor, from the data input signal. Because of the manner in which these input voltages are derived, the disclosed transceiver: (1) draws a ground current which can generate noise and disturb other nearby receivers, (2) dissipates an undesirably high power, and (3) is sensitive to switching noise, i.e. noise generated when the data switches between its states, for example between a logical "1" to logical "0" or vice versa.

As a result, a need exists in the art for a bi-directional transceiver circuit that requires no ground current, uses less power than previously disclosed circuits, and generates little switching noise.

SUMMARY OF THE INVENTION

Bi-directional transceivers fabricated in accordance with the present invention advantageously: (1) generate no ground current—thereby eliminating the effect of ground current noise on any current switch circuits on a chip that use ground as a reference signal for their data and sense levels; (2) dissipate less power than the previously disclosed tranceivers—in particular, the inventive transceiver does not use the d.c. bias networks of the above-cited transceiver and thereby dissipates half the power dissipated by the above-cited transceiver; (3) have lower switching noise than the above-cited transceiver—in particular, the inventive transceiver uses constant current sources to minimize the variation in the current flow between the power supply sink and source; and (4) have an improved sense to signal ratio for its circuits when compared to that of the above-cited transceiver—in particular, the inventive transceiver uses the voltage from the power supply to generate both the first and the second input voltages to differential amplifiers to improve this ratio.

The inventive transceiver comprises two circuits disposed on opposite ends of an interchip cable. In response to data input signals applied to the first and second circuits, the inventive transceiver generates a trilevel voltage with respect to ground at each end of the interchip cable. Thereupon, in each circuit, the trilevel voltage on the corresponding end of the interchip cable and data input signal to that circuit, are used to generate first and second inputs to a differential amplifier. Finally, the transceiver outputs are generated from the outputs of the differential amplifiers.

Each of the differential amplifiers is formed from a current switching circuit. For each of the first and second circuits: (1) the first input to its differential amplifier is derived from the trilevel voltage at the end of the interchip cable by a level shifter comprising a diode and a constant current sink and (2) the second input to its differential amplifier is derived from the data input signal applied to that circuit by a level shifter comprising a diode and a constant current sink.

BRIEF DESCRIPTION OF THE DRAWING

A complete understanding of the present invention may be gained by considering the following detailed description in conjunction with the accompanying drawing, in which.

DETAILED DESCRIPTION

Figure 1:
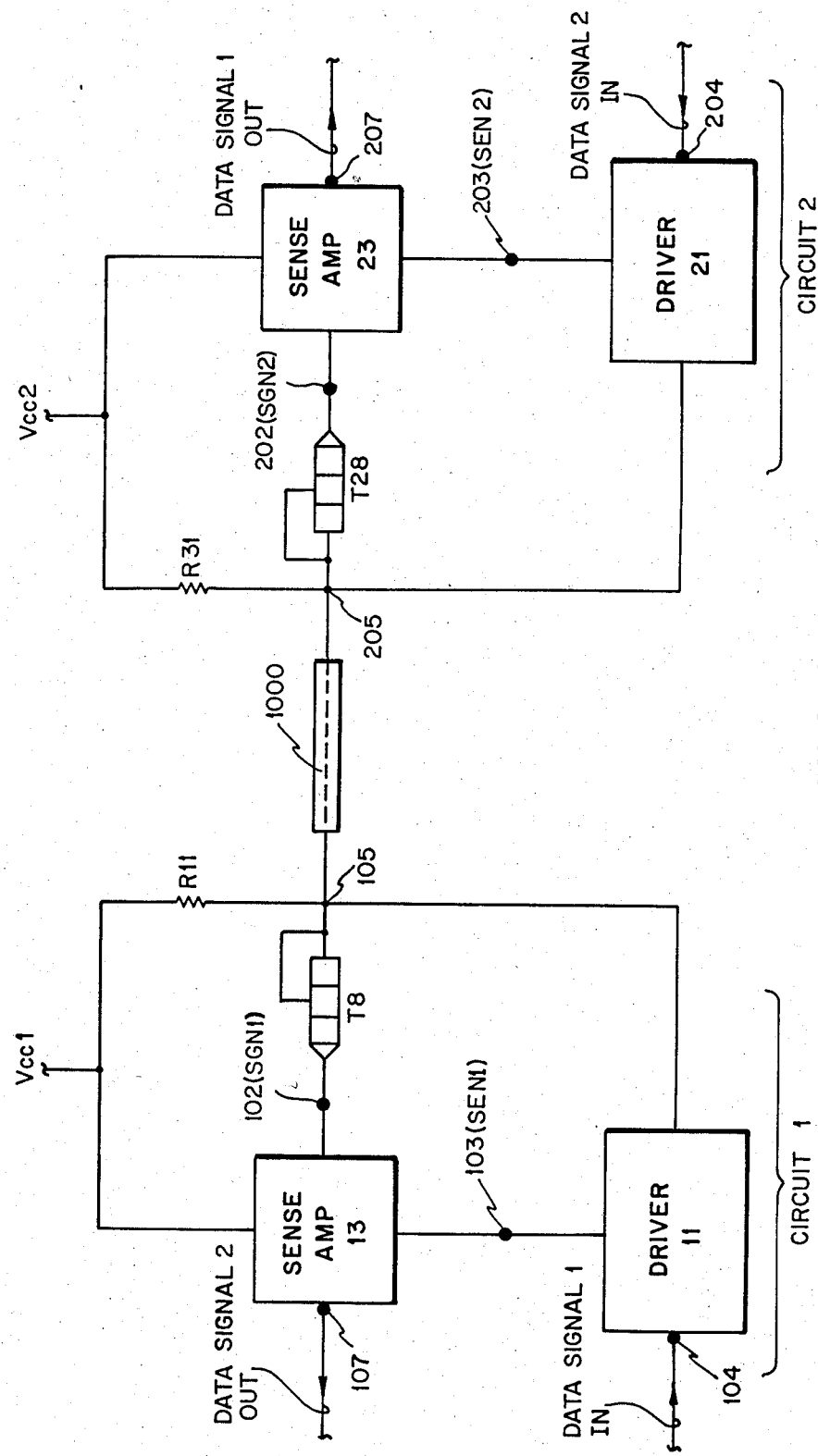
FIG. 1 shows, in pictorial form, a block diagram of a bi-directional transceiver.
Figure 2:
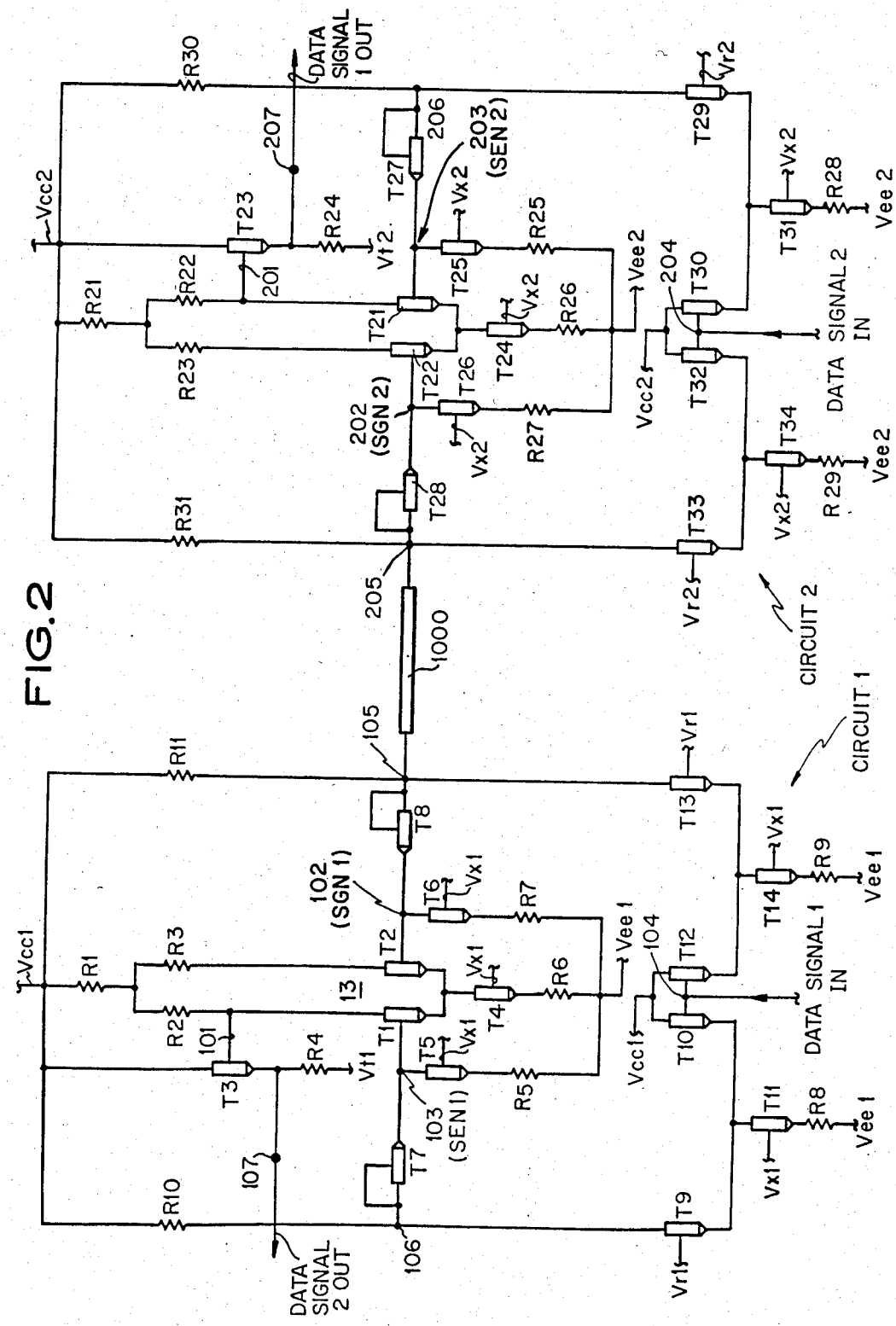
FIG. 2 shows, in pictorial form, a circuit diagram of an embodiment of the inventive bi-directional transceiver.

The general operation of the inventive bi-directional transceiver shown in FIG. 2 is understood by first considering the following description of the block diagram shown in FIG. 1.

FIG. 1 shows a bi-directional transceiver which simultaneously transmits and receives digital information over a single cable without the need of time division or frequency multiplexing. Circuit 1 and circuit 2 are connected to opposite ends of interchip cable 1000. Digital data signal 1, which is to be transmitted across interchip cable 1000, is applied to terminal 104 of driver 11 of circuit 1 and is output from terminal 207 of sense amplifier 23 of circuit 2. Digital data signal 2, which is also to be transmitted across interchip cable 1000, is applied to terminal 204 of driver 21 of circuit 2 and is output from terminal 107 of sense amplifier 13 of circuit 1.

In order to best understand the operation of the transceivers shown in FIGS. 1 and 2, we will consider some specific information. Digital data signals 1 and 2 are bi-level voltage signals, for example having a voltage of +300 mv for the first level, referred to hereinafter as a logical "1", and −300 mv for the second level, referred to hereinafter as a logical "0".

The voltages which are generated at various points in circuits 1 and 2, are illustratively set forth in Table 1. In Table 1, "Cable" is the voltage, with respect to ground, generated at each end of interchip cable 1000, i.e. at points 105 and 205; SGN1 is the voltage at point 102 in circuit 1 which is generated by shifting the level of the trilevel voltage at point 105 by means of diode T8 (SGN1 is applied to the first input of sense amplifier 13); SEN1 is the voltage at point 103 in circuit 1 which is generated by shifting the level of digital data signal 1 applied as input to driver 11 (SEN1 is applied to the second input of sense amplifier 13); SGN2 is the voltage at point 202 in circuit 2 which is generated by shifting the level of the trilevel voltage at point 205 by means of diode T28 (SGN2 is applied to the first input of sense amplifier 23); SEN2 is the voltage at point 203 in circuit 2 which is generated by shifting the level of digital data signal 2 applied as input to driver 21 (SEN2 is applied to the second input of sense amplifier 23). The voltages given in Table 1 are generated when drivers 11 and 21 receive digital data signals, and in response thereto, act as sinks of current in an amount which depends on the value of the digital data input.

TABLE 1

| Data 1 in | Data 2 in | SGN1 mv | SEN1 mv | SGN2 mv | SEN2 mv | Cable mv | Data 1 out | Data 2 out |
|---|---|---|---|---|---|---|---|---|
| 1 | 1 | 598 | 421 | 598 | 421 | 1330 | 1 | 1 |
| 1 | 0 | 146 | 421 | 146 | −120 | 920 | 1 | 0 |
| 0 | 0 | −401 | −120 | −401 | −120 | 379 | 0 | 0 |
| 0 | 1 | 146 | −120 | 146 | 421 | 920 | 0 | 1 |

As shown in Table 1, the voltage at each end of interchip cable 1000 is a trilevel voltage; the three levels taken with respect to ground at each end of the cable being 1330 mv, 920 mv, and 379 mv. As such, three levels can only distinguish between three cases: case "11" when both input digital data signals are "1" corresponds to the high voltage level (1330 mv), case "00" when both input digital data signals are "0" corresponds to the low voltage level (379 mv), and case "10" or case "01" when one input digital data signal is "1" and the other is "0" both correspond to the intermediate voltage level (920 mv).

However, whether considered in terms of the voltage at the ends of interchip cable 1000 or in terms of the shifted voltages SGN1 and SGN2, the cases "10" and "01" provide an ambiguity for the transceiver. Each circuit of the transceiver breaks the ambiguity between the "10" and "01" cases by shifting the level of the digital signal applied as input to its driver and then by applying the shifted level to its sense amplifier. Thus, for circuit 1, although sense amplifier 13 cannot determine whether the case is "10" or "01" by considering SGN1 alone, if sense amplifier 13 senses SEN1 at point 103 and thereby determines that digital data signal 1 is a "0", sense amplifier 13 then "knows" that digital data signal 2 must be a "1". In this case, sense amplifier 13 applies a "1" to output lead 107. Likewise, if sense amplifier 13 determines that digital data signal 1 is a "1", it "knows" that digital data signal 2 must be a "0". In this case, sense amplifier 13 applies a "0" to output lead 107.

Thus, in circuits 1 and 2, the proper differences between the voltages input into sense amplifier 13 at points 102 and 103, and between the voltages input into sense amplifier 23 at points 202 and 203, are required in order to obtain the proper outputs. As seen from Table 1, sense amplifier 13 generates a "1" at output 107 when the input at point 102 is higher than the input at point 103, and sense amplifier 13 generates a "0" at output 107 when the input at point 102 is lower than the input at point 103. For example from Table 1: output 107 is a "1" (1) when SGN1 at point 102 equals 598 mv and SEN1 at point 103 equals 421 mv and (2) when SGN1 at point 102 equals 146 mv and SEN1 at point 103 equals 120 mv; output 107 is a "0" (1) when SGN1 at point 102 equals 146 mv and SEN1 at point 103 equals 421 mv and (2) when SGN1 at point 102 equals −401 mv and SEN1 at point 103 equals −120 mv.

The appropriate voltages, set forth above, are generated by circuits 1 and 2 in response to the digital data signals applied thereto in a manner which will be explained in detail as part of the discussion of the operation of the preferred embodiment shown in FIG. 2.

A preferred embodiment of the inventive transceiver is shown in FIG. 2. This embodiment comprises two circuits connected to opposite ends of interchip cable 1000. All transistors shown in FIG. 2 are npn transistors. Since circuits 1 and 2 are symmetric, various overall characteristics of these circuits will first be explained in the context of circuit 1. Thereafter the operation of the inventive transceiver as a whole will be described by considering the four possible cases of digital data inputs: case "11", case "00", case "10", and case "01".

Digital data signal 1 provides input data to circuit 1 at point 104. Output from circuit 1 is taken at point 107. This output is generated from the output of the differential amplifier formed from transistors T1 and T2 and resistors R1, R2 and R3. The output of the differential amplifier is determined by the voltages at points 102 and 103.

Note that currents in circuit 1 flow between the power supply source and sink at voltages Vcc1 and Vee1, respectively. In circuit 2 the corresponding current flows are between Vcc2 and Vee2. (This 1,2 nomenclature is used because the circuits could be on different modules. Of course, the values of Vcc1 and Vcc2 are much closer to each other if the circuits are on the same module, as are all the corresponding voltages.) All such current flows are through constant current sinks so that the same amount of current flows whether the data signal is a "1" or a "0". For example, the current flowing between Vcc1 and Vee1: (1) through either transistor T12 or T13 is kept constant by a constant current sink comprising transistor T14 and resistor R9, voltage Vx1 determines the emitter current in T14 and thereby the current in the sink; (2) through either transistor T9 or T10 is kept constant by a constant current sink comprising transistor T11 and resistor R8, voltage Vx1 determines the emitter current in T11 and thereby the current in the sink; (3) through either transistor T1 or T2 is kept constant by a constant current sink comprising transistor T4 and resistor R6, voltage Vx1 determines the emitter current in T4 and thereby the current in the sink; (4) through diode T8 is kept constant by a constant current sink comprising transistor T6 and resistor R7, voltage Vx1 determines the emitter current in T6 and thereby the current in the sink; and (5) through diode T7 is kept constant by a constant current sink comprising transistor T5 and resistor R5, voltage Vx1 determines the emitter current in T7 and thereby the current in the sink. In this manner, this embodiment of the inventive transceiver minimizes the noise caused by switching between a "1" and a "0" and vice versa and has no switching current from ground.

Case "11"

Digital data signal 1 having a value of 300 mv, i.e. a "1", is applied to point 104 of circuit 1 and thereupon to the base of transistors T10 and T12. Further, digital data signal 2 having a value of 300 mv, i.e. a "1", is applied to point 204 of circuit 2 and thereupon to the base of transistors T30 and T32. The collectors of transistors T10 and T12 are both connected to voltage source Vcc1, having a value of approximately 1330 mv, and the collectors of transistors T30 and T32 are connected to voltage source Vcc2, having a value of approximately 1330 mv. Also, in this embodiment both Vee1 and Vee2 are chosen to have a value approximately equal to −1700 mv. In such an instance, transistors T10 and T12 are both "on". In addition, transistors T30 and T32 are both "on" as well. The base of transistors T9 and T13 are connected to voltage Vr1. In this instance, Vr1 is chosen so that when transistors T10 and T12 are "on", transistors T9 and T13 are "off" and no current flows therethrough. Thus, the Vcc1 to Vee1 current flows through transistors T10 and T12.

The base of transistors T29 and T33 are connected to voltage Vr2. In this instance, Vr2 is chosen so that when transistors T30 and T32 are "on", transistors T29 and T33 are "off" and no current flows therethrough. Thus, the Vcc2 to Vee2 current flows through transistors T30 and T32.

Let us consider how voltages SGN1 and SGN2, at points 102 and 202 of circuits 1 and 2, respectively, are generated. Consider points 105 and 205 on either side of interchip cable 1000. Since no current is flowing through transistors T13 and T33 in this case, the voltage at point 105 equals Vcc1, here chosen to be 1330 mv, and the voltage at point 205 equals Vcc2, here chosen to be 1330 mv. Diode T8 in circuit 1 and diode T28 in circuit 2 shift the voltages appearing at points 105 and 205, respectively, to form voltages SGN1 and SGN2 at points 102 and 202, respectively. A constant current sink comprising transistor T6 and resistor R7 is always on and draws only enough current to keep diode T8 conducting so that the voltage at one end of the diode tracks the other end with a constant voltage drop therebetween. A constant current sink comprising transistor T26 and resistor R27 keeps diode T28 conducting in a like manner to diode T8. As a result, the 1330 mv voltage at point 105 is shifted to 598 mv at point 102 and the 1330 mv voltage at point 205 is shifted to 598 mv at point 202. These voltages are the first inputs to the differential amplifiers of circuits 1 and 2.

Let us consider how voltages SEN1 and SEN2, at points 103 and 203 of circuits 1 and 2, respectively, are generated. Consider points 106 and 206 of circuits 1 and 2, respectively. Since no current is flowing through transistors T9 and T29 in this case, the voltage at point 106 equals Vcc1, 1330 mv, and the voltage at point 206 equals Vcc2, 1330 mv. Diode T7 in circuit 1 and diode T27 in circuit 2 shift the voltages appearing at points 106 and 206, respectively, to form voltages SEN1 and SEN2 at points 103 and 203, respectively. A constant current sink, comprising transistor T5 and resistor R5, is always on and draws only enough current to keep diode T7 conducting so that the voltage at one end of the diode tracks the other end with a constant voltage drop therebetween. A constant current sink comprising transistor T25 and resistor R25 keeps diode T27 conducting in a like manner to diode T5. As a result, the 1330 mv voltage at point 106 is shifted to 421 mv at point 103 and the 1330 mv voltage at point 206 is shifted to 421 mv at point 203. These voltages are the second inputs to the differential amplifiers of circuits 1 and 2.

In this case, in the differential amplifier of circuit 1, transistor T1 is "off" and transistor T2 is "on". Thus, the output at point 107 is a "1". Similarly, in the differential amplifier of circuit 2, transistor T21 is "off" and transistor T22 is "on" and the output at point 207 is a "1".

Case "00"

Digital data signal 1 having a value of −300 mv, i.e. a "0", is applied to point 104 of circuit 1 and thereupon to the base of transistors T10 and T12. Further, digital data signal 2 having a value −300 mv, i.e. a "0", is applied to point 204 of circuit 2 and thereupon to the base of transistors T30 and T32. In such an instance, transistors T10 and T12 are both "off". In addition, transistors T30 and T32 are both "off" as well. In this case, the previously chosen value Vr1 is such that when transistors T10 and T12 are "off", transistors T9 and T13 are "on" and current flows therethrough. Thus, the Vcc1 to Vee1 current flows through transistors T9 and T13.

The base of transistors T29 and T33 are connected to voltage Vr2. In this case, the previously chosen value Vr2 is such that when transistors T30 and T32 are "off", transistors T29 and T33 are "on" and current flows therethrough. Thus, the Vcc2 to Vee2 current flows through transistors T29 and T33.

Let us consider how voltages SGN1 and SGN2, at points 102 and 202 of circuits 1 and 2, respectively, are generated. In this case, since transistor T9 is "on", current flows through resistor R10 and lowers the voltage appearing at point 106. Likewise, in circuit 2, since transistor T29 is "on", current flows through resistor R30 and lowers the voltage appearing at point 206. In this case, diodes T7 and T27 shift the level of the voltage appearing at points 106 and 206, respectively, in the same manner as discussed hereinabove. Thus, SEN1 appearing at point 103 as the second input to the differential amplifier of circuit 1 is −120 mv and SEN2 appearing at point 203 as the second input to the differential amplifier of circuit 2 is −120 mv.

Let us consider how voltages SGN1 and SGN2, at points 102 and 202 of circuits 1 and 2, respectively are generated. In this case, since transistor T13 is "on", current flows through resistor R11. This reduces the voltage appearing at point 105 from the 1330 mv of Vcc1 to 379 mv. Similarly, since transistor T33 is "on", current flows through resistor R31. This reduces the voltage appearing at point 205 from the 1330 mv of Vcc2 to 379 mv. In this case, diodes T8 and T28 shift the level of the voltage appearing at points 105 and 205, respectively, in the same manner as discussed hereinabove. Thus, SGN1 appearing at lead 102 as the first input to the differential amplifier of circuit 1 is −401 mv and SGN2 appearing at point 102 as the first input to the differential amplifier of circuit 2 is −401 mv.

In this case, in the differential amplifier of circuit 1, transistor T1 is "on" and transistor T2 is "off". Thus, the output at point 107 is a "0". Similarly, in the differential amplifier of circuit 2, transistor T21 is "on" and transistor T22 is "off" and the output at point 207 is a "0".

Case "10"

Digital data signal 1 having a value of 300 mv, i.e. a "1", is applied to point 104 of circuit 1 and thereupon to the base of transistors T10 and T12. Further, digital data signal 2 having a value of −300 mv, i.e. a "0", is applied to point 204 of circuit 2 and thereupon to the base of transistors T30 and T32. In such an instance, transistors T10 and T12 are both "on". In addition, transistors T30 and T32 are both "off". As described above, since transistors T10 and T12 are "on", transistors T9 and T13 are "off" and no current flows therethrough. Thus, the Vcc1 to Vee1 current flows through transistors T10 and T12.

Let us consider how voltage SEN1, at point 103 of circuit 1 is generated. Consider point 106 of circuit 1. Since no current is flowing through transistor T9 in this case, the voltage at point 106 equals Vcc1, 1330 mv. Diode T7 in circuit 1 shifts the voltage appearing at lead 106 to form voltage SEN1 at point 103. In this case, the voltage at point 106 is shifted from 1330 mv to 421 mv.

Let us consider how voltage SEN2, at point 203 of circuit 2 is generated. Consider point 206 of circuit 2. As described above, since transistor T30 is "off", transistor T29 is "on" and current flows therethrough. Thus, current flows through resistor R30 and lowers the voltage appearing at point 206. Diode T27 in circuit 2 shifts the voltage appearing at lead 206 to form voltage SEN2 at point 203. In this case, the voltage level at lead 206 is shifted to −120 mv.

Let us consider how SGN1 and SGN2 are generated. From above, we have seen that transistor T13 in circuit 1 is "off" and draws no current and transistor T33 in circuit 2 is "on" and draws current. The current flowing through transistor T33 and thence through transistor T34 flows partially from Vcc1 through resistor R11 and partially from Vcc2 through resistor R31. If we choose R11=R31, then the current flowing through the resistors is the same, each being equal to half the current through T33. In this case, the voltage at points 105 and 205 drops from the 1330 mv of Vcc1 and Vcc2 to 920 mv. These voltages are then shifted by diodes T8 and T28, respectively, to form SGN1 and SGN2, each having a value of 146 mv.

In this case, in the differential amplifier of circuit 1, transistor T1 is "on" and transistor T2 is "off". Thus, the output at point 107 is a "0". Further, in the differential amplifier of circuit 2, transistor T21 is "off" and transistor T22 is "on" and the output at point 207 is a "1".

Case "01"

This case operates in the same manner as the "10" case, only with the functions of circuits 1 and 2 elements being reversed.

Figure 3:
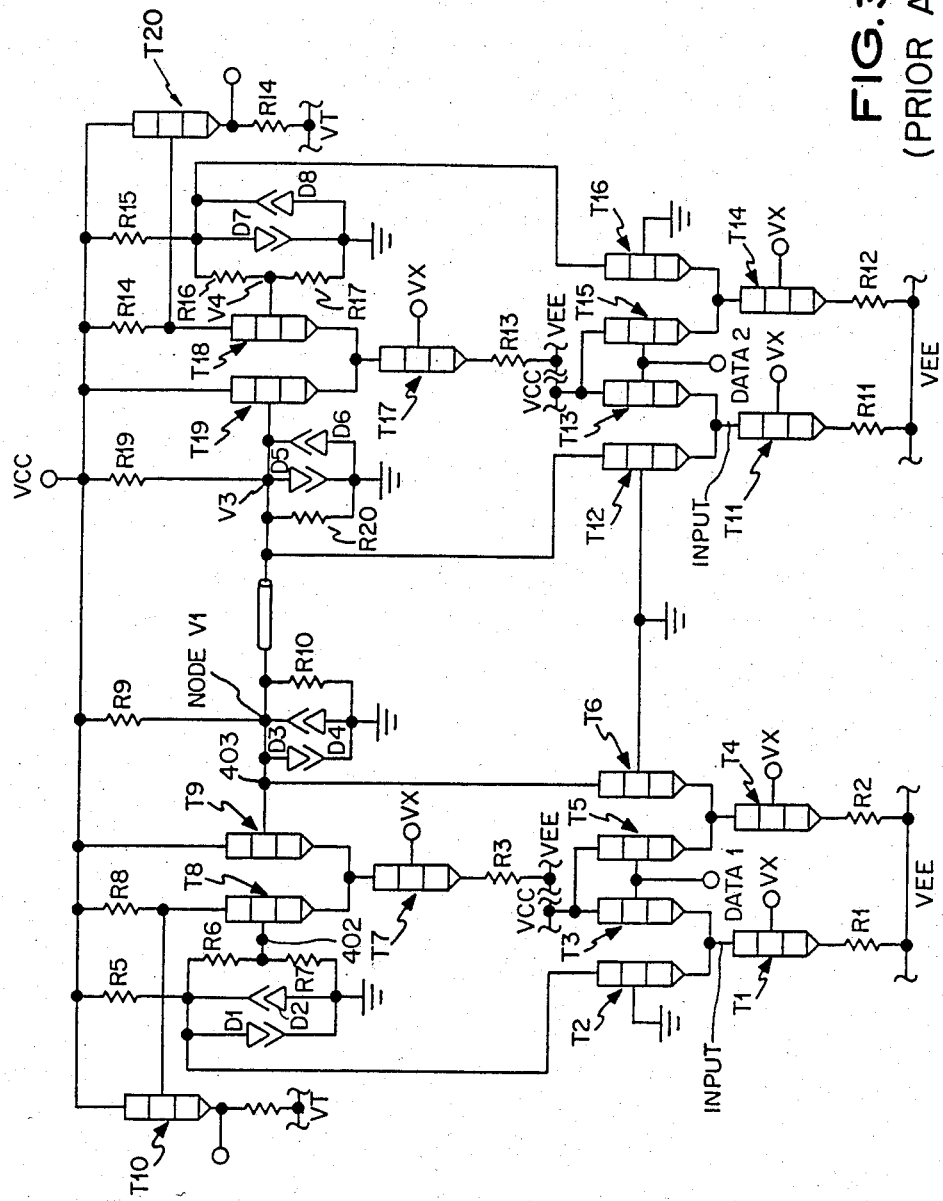
FIG. 3 shows, in pictorial form, a circuit diagram of a bi-directional transceiver disclosed in the art.

FIG. 3 shows the above-cited transceiver disclosed in the art. The detailed operation of the disclosed transceiver is set forth in the above-cited article. In particular, the article details how the voltages at points 403 and 402—first and second inputs to the current switching circuit of circuit 1—and the voltages at points V3 and V4—first and second inputs to the current switching circuit of circuit 2—are generated by means of voltage dividers and Schottky diodes. The article also specifies the manner in which ground currents are generated in producing these voltages.

The essential differences between the inventive transceiver and the disclosed transceiver are: (1) the inventive transceiver generates SEN1 by using a diode which is forward biased by a constant current sink, whereas the disclosed transceiver utilizes Schottky diodes D1 and D2 and the voltage divider formed from resistors R5, R6, and R7 to generate the voltage at point 402 which is analogous to SEN1; (2) the inventive transceiver generates SGN1 by using a diode which is forward biased by a constant current sink, whereas the disclosed transceiver utilizes Schottky diodes D3 and D4 and resistor R10 to generate the voltage at point 403 which is analogous to SGN1; and (3) analogous substitutions for circuit 2 of the two transceivers.

As a result, the disclosed transceiver has disadvantages in that the voltages analogous to SEN1 and SGN1 of the inventive transceiver depend on ground voltages and voltage dividers. This adds many extra components to the circuits and causes problems in designing these extra components within design tolerances. In addition, the use of the voltage dividers increases the power dissipation of the disclosed transceiver and increases the danger of saturating the transistors analogous to transistors T13 and T33 of the inventive transceiver. Moreover, in the disclosed transceiver, the voltages analogous to SEN1 and SGN1 depend on ground and voltage dividers whereas in the inventive transceiver, SEN1 and SGN1 voltages only depend on Vcc1. Thus, for all these reasons, the inventive transceiver provides a substantial improvement over the disclosed transceiver.

Clearly, those skilled in the art recognize that further embodiments of the present invention may be made without departing from the teachings of the present invention.

What is claimed is:

1. A simultaneous bi-directional transceiver comprises two circuits connected to opposite ends of a signal transmission line, each of the circuits comprising:

a differential amplifier having first and second inputs and an output, a first constant current sink connected to the first input of said differential amplifier, a first diode connected at one end to the first input of said differential amplifier, the other end of the first diode being connected to one end of a first impedance means and a source of input signals, and to one end of the signal transmission line, the other end of the first impedance means being connected to a source of voltage, a second constant current sink connected to the second input of said differential amplifier, a second diode connected at one end to the second input of said differential amplifier, the other end of the second diode being connected to one end of a second impedance means and the source of input signals, the other end of the second impedance means being connected to the source of voltage.

2. The transceiver claimed in accordance with claim 1 wherein the differential amplifier comprises a current switching circuit.

3. The transceiver claimed in accordance with claim 2 wherein the first constant current sink comprises a transistor having its collector connected to the one end of the first diode and a first resistor connected between its emitter and a second source of voltage, and the second constant current sink comprises a transistor having its collector connected to the one end of the second diode and a second resistor connected between its emitter and the second source of voltage.

4. The transceiver claimed in accordance with claim 3 wherein the first diode and the second diode each comprise a transistor having a short between its base and collector.

5. The transceiver claimed in accordance with claim 4 wherein a third source of voltage is applied to the base of the transistor of the first and second current sinks to bias each transistor so that each transistor draws only enough current to forward bias the first and second diode, respectively.

6. The transceiver claimed in accordance with claim 1 wherein the source of input signals for each circuit comprises a current switch, each current switch including a constant current sink.

* * * * *